June 1, 1965
M. GELFAND ETAL
3,186,932
APPARATUS FOR FORMING PHONOGRAPH RECORD
MASTERS, MOTHERS, AND STAMPERS
Filed Dec. 10, 1962
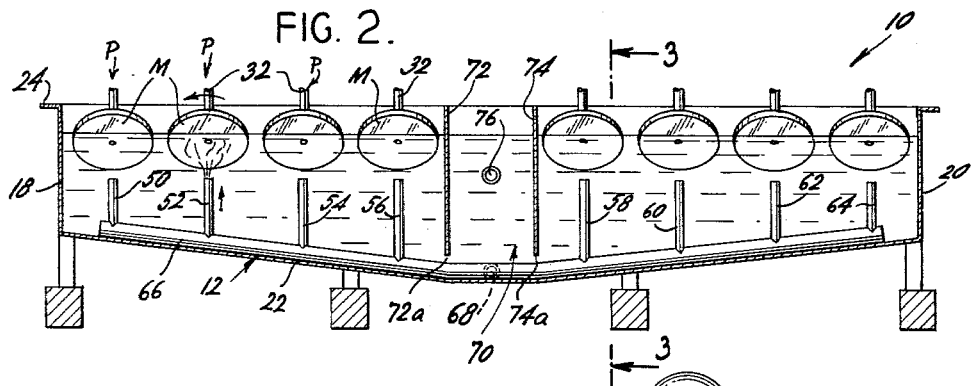
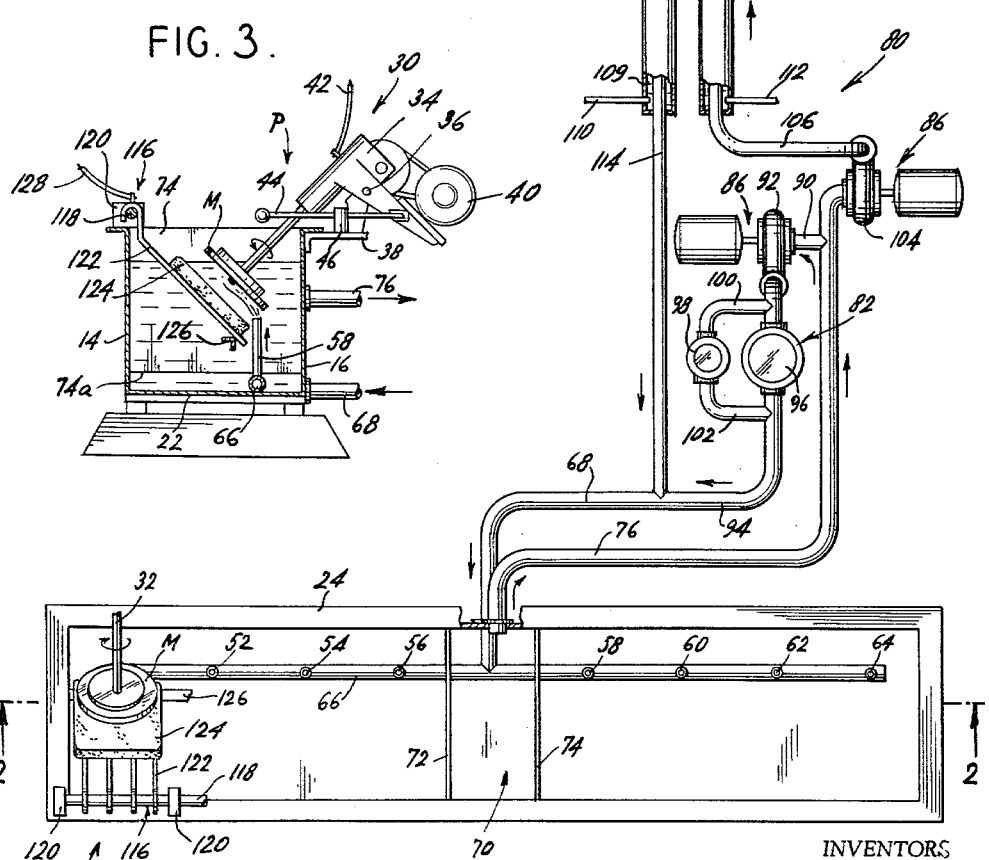
INVENTORS
MILTON GELFAND
WALLACE SCOTT
BY
Amster & Levy
ATTORNEYS

United States Patent Office 3,186,932
Patented June 1, 1965

3,186,932
APPARATUS FOR FORMING PHONOGRAPH RECORD MASTERS, MOTHERS, AND STAMPERS
Milton Gelfand and Wallace Scott, Bronx, N.Y., assignors to Audio Matrix, Inc., Bronx, N.Y., a corporation of New York
Filed Dec. 10, 1962, Ser. No. 243,388
6 Claims. (Cl. 204—216)

The present invention relates generally to the manufacture of phonograph records and to electro-forming equipment and processes therefor and relates specifically to a method and apparatus for the production of metallic negative reproductions of the surfaces of flat disks.

In order to understand the present invention, it is necessary to understand a portion of the general process in the manufacture of phonograph records. After sound has been recorded and cut by a recording lathe onto a plastic master record, it is necessary to make accurate and sturdy negative reproductions of the surface of this plastic master in order to mass produce copies of the record. These negative reproductions, called stampers, are used to physically duplicate the surface of the master. The most successful method of making such stampers is to first produce a negative copy of the original master by an electro-forming process. The plastic master is covered with a thin layer of silver to make it conductive and a layer of nickel is then plated onto the face of the master. When the nickel has been plated in sufficient thickness to maintain its structural integrity, it is stripped from the face of the plastic master. The surface of the resulting metallic negative, called the metallic master, is then passivated and a second plating operation is performed which results in a metallic reproduction of the original plastic master, which is called a mother. The surface of the mother is passivated and a third electro-plating operation is performed in order to produce a stamper. Of course, a great number of stampers may be formed from one given mother which stampers may then be used in conventional equipment to form commercial records.

A number of difficult problems have existed in the art of producing record stampers by electro-plating processes. Among these many problems has been lack of reliability in producing a consistent product with regard to the thickness of the stamper. The thickness of a stamper is critical in the manufacturing process since the thickness of the stamper will govern the thickness and molding of the resulting record. If a stamper is too light and requires return to the plating tank for the deposit of more metal, obvious inefficiencies in the manufacturing process and possible defects are produced. Still further, prior art processes and apparatus produced stampers which varied in thickness at different locations which variations resulted in variations in the thickness of the stamped records and produced serious molding difficulties. Still further, the electrolyte used in these plating processes was not as chemically pure and physically clean as desired, thereby producing high surface noises and brittle body structure leading to poor quality records and low stamper life. A further disadvantageous feature of stampers produced according to prior art methods concerns the low fidelity reproduction and short stamper life which results from coarse grained nickel deposits produced by low current plating. In the past it was necessary to restrict the plating current due to the limitations of the equipment and methods employed. Still further, prior art equipment and processes required a number of different plating setups and operations for each single electro-formed item which several operations obviously is inefficient in comparison to a one step process.

Accordingly, it is generally an object of the present invention to provide an improved plating process for the manufacture of masters, mothers and stampers for use in the phonograph record industry. Specifically, it is an object of the present invention to obviate one or more of the aforementioned disadvantageous features found in the prior art systems of electro-forming for the record industry.

It is an object of the preset invention to provide an apparatus for the manufacture by electro-plating of masters, mothers and stampers which apparatus has a high degree of reliability.

It is still further within the contemplation of the present invention to provide an apparatus for the manufacture of metal masters, mothers and stampers for phonograph records wherein a plurality of individual electro-plating operations may proceed at one time, each with separate controls and each with an improved measure of reliability with regard to thickness of the finished product and fidelity of reproduction of the surface.

It is still further within the contemplation of the invention to provide a manufacturing process wherein the ease of production of masters, mothers and stampers is enhanced, wherein the quality of product is improved and wherein labor costs are reduced.

In accordance with the process aspects of the present invention there is provided a process for forming a controlled thickness negative reproduction on one face of a flat disk matrix comprising a series of individual steps starting with the passivating of the surface of the matrix. The matrix is then mounted in a nickel sulfamate electrolyte with a small portion of the circumference extending outwardly from the surface of the electrolyte. In accordance with the process, a constant stream of filtered electrolyte, at a temperature between 100° and 120° Fahrenheit, is flowed across the submerged portion of the matrix from a point below the matrix such that fresh filtered electrolyte is constantly bathed across all points of the surface of the matrix. The matrix is rotated about its own axis and is exposed to nickel electrodes placed parallel to and in proximity to the face of the matrix. In compensation for the fresh filtered electrolyte which is constantly flowed across the face of the matrix, electrolyte is removed from the plating tank from a position below the matrix thereby maintaining a constant level in the plating tank. Plating current is introduced in approximately 50 amperes and is gradually increased in steps to a level between 175 and 200 amperes and is maintained at that level until the desired thickness of metal is deposited upon the matrix. The matrix is then removed from the electrolyte and the electro-formed plated layer of nickel is stripped therefrom to expose the negative reproduction of the surface of the matrix.

In accordance with the apparatus features of the present invention there is provided a one step plating apparatus comprising an elongated tank having a bottom inclined toward the center and having a series of individual plating stations. Each of the plating stations has a cathode assembly for mounting a disk-like matrix for rotation about its own axis while partially submerged in the electrolyte in the tank. An anode structure is provided in proximity to the plating stations and includes support means for holding nickel anodes in parallel relationship to the face of the matrix during plating operations. Pumping and delivery means are incorporated within the tank and include a flow nozzle at each plating station for directing a flow of electrolyte on to the circular face of the rotating matrix. Return means are provided to extract electrolyte from the tank in a volume equal to that of the amount of electrolyte being flowed on to the matrices to maintain an even level in the tank. Heat exchange and filtering means are provided within the electrolyte piping mechanisms for controlling the temperature range of the electrolyte and for removing impurities from the electrolyte delivered to the plating tank.

Further objects featured and advantages of the present invention will be best appreciated by reference to the following detailed description taken in conjunction with the accompanying drawings wherein:

FIG. 1. is a plan view of the apparatus of the present invention with portions removed for the sake of clarity and partially in schematic form;

FIG. 2 is a sectional view taken along the line 2—2 of FIG. 1 and looking in the direction of the arrows illustrating the construction of the plating tank and the position of the individual matrices with portions omitted for the sake of clarity; and FIG. 3 is a sectional view taken along the line 3—3 of FIG. 2 and looking in the direction of the arrows illustrating the various components contained at each plating station.

Referring now specifically to the darwings, description will be made of the apparatus according to the present invention and then description of the plating process will be made.

The apparatus, generally designated by the numeral 10, includes an elongated plating tank 12 having a front wall 14 and a rear wall 16 and side walls 18, 20 and a bottom 22 which is inclined from each end of the tank 12 toward a low point at the center of the tank. A ledge 24 is provided all the way around the tank 12 and the entire inside surface of the tank may be sheathed with an appropriate layer of rubber or other corrosive resistant material. The purposes and function of the inclined bottom 22 of the tank 12 will become apparent as the description proceeds.

At a number of different locations along the length of the tank 12, means are provided to form individual plating stations generally designated by the letter P. There are eight such plating stations P illustrated on the tank 12. At each plating station there is positioned a cathode structure 30 which is fully described in the copending application Serial No. 150,527, filed on November 6, 1961, and entitled plating apparatus.

The cathode construction 30 includes a shaft 32 mounted for rotation within a housing 34 with the housing in turn being pivotally mounted at 36 on a bracket structure 38 secured to the plating tank 12. A motor and drive means 40 are provided in operative engagement with a shaft 32 for rotation of the shaft 32 about its own axis. An electrical connection 42 is provided to the cathode structure 30 and current is transmitted to the shaft 32 and to a matrix M secured at the front and lower end of the shaft 32. The cathode assembly 30 is tiltable about the pivot 36 by means of a handle 44 and the lock 46 such that the matrix M on the end of the shaft 32 may be lowered into the plating position as shown in FIG. 3 of the drawing and raised into a horizontal position with the matrix being completely free from the electrolyte.

In association with each of the several cathode assemblies 30 at each of the plating stations P, there are positioned delivery nozzles 50, 52, 54, 58, 60, 62, 64 which extend substantially vertically from the bottom 22 of the tank 12 and are directed such that a flow of electrolyte is directed onto the circular faces of the matrices M. Each of the flow nozzles 50-64 is connected to a main input manifold 66 which is positioned at the bottom 22 of the tank 12. A delivery pipe 68 passes through a suitable connection through the rear wall 16 to the manifold 66 for the delivery of electrolyte upwardly through the flow nozzles onto the faces of the matrices M. As seen in FIGS. 1 and 2, the input pipe 68 is positioned at the center of the tank 10 at a central portion generally designated by the numeral 70. The central portion 70 is separated from the remainder of the tank 12 by means of a pair of baffle plates 72, 74 positioned from front to rear of the tank 12 with their respective lower edges 72a, 74a positioned slightly above the bottom 22 of the tank 12 thus allowing a passage for electrolyte from the large end chambers of the tank to the middle chamber 70. At a location above the main delivery pipe 68 there is provided an exit pipe 76 which is positioned within the confines of the central chamber 70. It will be appreciated that electrolyte which is drawn outwardly from the tank 12 through the exit pipe 76 will, of necessity, and due to the construction of the tank 12, be drawn from the bottom of the tank underneath the edges 72a, 74a of the baffle plates 72, 74. Thus, as fresh electrolyte is pumped into the tank through the manifold 66 and the flow nozzles 50–64, it will flow upwardly over the faces of the matrices M and will then travel downwardly to the bottom of the tank and toward the center portion 70 and outwardly through the exit pipe 76.

The electrolyte supply system, generally designated by the numeral 80, is illustrated in FIG. 1 and generally comprises a filtering system 82, a heat exchange system 84 and pump means generally designated by the numeral 86. The electrolyte flow system in the apparatus 10 is a continuous flow operation and includes means for two separate and independent continuous flow circuits for electrolyte. The first one includes the exit tank 76 through which electrolyte is removed from the tank 12 and is delivered to a branch pipe 90 through a first pump 92 and then to the filter means 82. Extending from the filter means 82 is the filter exit pipe 94 which joins into the main entry pipe 86 for the delivery of filtered electrolyte into the tank 12. The filter means 82 includes two filters in parallel, the first of which is an organic filter 96 and the second of which is a mechanical filter 98 secured into the system by its appropriate parallel pipeline 100, 102. The filters 96, 98 may be of any conventional construction to remove organic and mechanical impurities and may take the form of one dual-function filter.

The second circuit of the electrolyte system 80 comprises the heat exchanger 84 which receives electrolyte from the main exit tube 76 through a pump 104 and to the heat exchange input pipe 106. The heat exchanger 84 may be of any conventional design and in this case is schematically shown to be a fluid jacket 108 surrounding the pipe 106 through a U-shaped portion. Heat exchange fluid inlet and outlet pipes 110, 112 are provided in the jacket 108 for the introduction and removal of the heat exchange fluid 109. Electrolyte which is passed through the heat exchanger 84 flows outwardly through the heat exchanger exit pipe 114 and into the main input pipe 68 for transmittal through the flow nozzle 50 through 64. Thus, the electrolyte contained within the apparatus 10 is continuously pumped through the filtering means 82 and the heat exchange means 84 such that the electrolyte which is flowed onto the matrices M is continuously purified and is maintained at the optimum plating temperature.

In association with each of the cathode assemblies 30 at each of the plating stations P and along the front edge of the plating tank 10, there is positioned an anode assembly generally designated by the numeral 116. The anode assembly 116 includes an anode bar 118 mounted on the tank 112 by means of insulated blocks 120. A plurality of hangers 122 extend downwardly from the anode bar 118 and at an angle into the tank and are electrically connected to and support the anodes 124 in a position parallel to the face of the matrices M. A frame 126 may be supplied adjacent the bottom of the tank to supply support for the lower ends of the anode 124. An anode cable 128 (see FIG. 3) is connected to the anode bar 118 at one end and to the other end to an electrical control system which is also connected to the cathode cable 42. The electrical control system for the apparatus 10 includes a separate control console for each of the plating stations P such that the plating current and plating periods for each of the stations may be independently controlled and such that each of the plating stations may operate independently of the others.

Reference will now be made to the process for plating which is accomplished in the above described apparatus. Preliminary to describing the electroplating process itself, it should be understood that if the item to be reproduced is a non-conductor, such as an original plastic master, it must be given a conductive coating. In the case of the plastic master this coating is provided by applying an extremely thin layer of silver to the surface of the plastic master. When making a nickel mother from a master or a stamper from a mother, the silvering step is of course unnecessary. After the metallic surface to be reproduced has been cleaned and passivated by a substance such as potassium dichromate, the matrix is in condition to be placed on the cathode assembly 30 and to have a deposit of nickel or the like plated thereon.

When the matrix end is lowered into the tank, by pivoting the cathode assembly 30 about its pivot 36, the matrix is preferably immersed in the electrolyte with a small portion of its circumference extending outwardly therefrom. This is to control the undesirable variation and plating thickness which normally occurs at the edges of the matrix. Specifically, because of the increased plating current density which occurs at the sharp edges of a cathode, thicker plating occurs at the edges than at the flat central areas. By rotating the circular matrix and by having a portion of the matrix extend outwardly from the electrolyte with a central circular portion of the electrode constantly maintained within the electrolyte, the amount of plating which occurs at the edges of the matrix can be controlled with respect to the amount of plating at the center and proper positioning of the matrix with regard to the level of the electrolyte maintained in the system is possible to compensate for the normal increased plating thickness which occurs at the edges of the matrix. The partial submersion and rotation of the matrix is more fully explained in the above identified copending application, Serial No. 150,527, now abandoned. Further steps in the process according to the present invention include flowing a stream of filtered electrolyte at a temperature between 100° F. and 120° F. across the face of the matrix to provide a constantly moving and constantly fresh supply of electrolyte exists at the plating surface. An anode, in this case a nickel anode, is positioned a slight distance from the face of the matrix and parallel thereto and plating current is introduced through the electrolyte and between the anode and the cathode to begin the plating operations. The plating current is introduced at approximately 50 amperes for a conventional 12-inch disk and is continued at that level for approximately 10 minutes. The plating current is then increased to 100 amperes for approximately an additional 10 minutes and is increased once again to approximately 150 amperes for a still further period of ten minutes. At the end of the 150 ampere period the current is increased to between 175 to 200 amperes and is maintained at that level until the desired thickness of plating is effected. It will of course be recognized that use of such high plating curernts produces a fine grain deposit of superior characteristics.

It should be appreciated that during the plating period constantly refreshed electrolyte solution is bathed across the plating surface of the cathode, the temperature of the electrolyte is maintained and the cathode itself is rotated with a portion extending outwardly from the electrolyte to provide both agitation and to compensate for the natural unevenness of plating which would normally build up a thicker plating concentration at the edges of the cathode.

It is convenient to provide an ampere-hour meter for each of the plating stations such that the total ampere-hours may be automatically tabulated and when the desired plating has been accomplished, to provide an automatic shut-off which either reduces the plating current to a low level of approximately 10 amperes or halts plating entirely. The matrix and plated layer deposited thereon are then removed from the plating tank and the plated layer is stripped from the matrix exposing the negative reproduction of the matrix.

It will be appreciated that there is provided in accordance with the present invention an apparatus and process for the electro-forming of metal masters, mothers and stampers whereby a superior product is produced in a highly simplified and semi-automatic operation.

Although the drawings and the foregoing description relate to one particular embodiment of the present invention, other embodiments may be formulated which incorporate significant aspects of the invention. Therefore, the following claims would be interpreted broadly in a manner consistent with the spirit and scope of the invention.

What we claim is:

1. An apparatus for electro-forming metallic masters, mothers, and stampers for the manufacture of photograph records comprising an elongated plating tank having a pair of plating sections at opposite ends of the tank and a central portion between said plating sections, said tank having a bottom inclined downwardly toward the central portion such that said tank is of a greater depth at the central portion than at the ends, a pair of baffle plates separating said central portion from said plating sections, said baffle plates extending from front to rear in said tank and spaced from the bottom of said tank providing a flow passage between said central portion and said plating sections, means defining a plurality of plating stations along the length of said tank including a cathode assembly at each of said stations, said cathode assemblies each having a shaft mounted for rotation about its own axis and for tilting movement of one end of the shaft into and out of the plating tank, said shaft having means at said end for securing a disk-like matrix thereto perpendicular to the shaft axis, an anode assembly mounted on the front of said tank including anodes in parallel relationship to the matrices on said cathode shafts when positioned within said tank, an electrolyte circulatory and flow system comprising a flow nozzle at each of said plating stations oriented to flow electrolyte over the circular surface of said metallic masters, an input manifold connected to each of said flow nozzles, an exit pipe in said tank at said central portion for removing electrolyte from said tank, a heat exchanger in a first hydraulic circuit interconnecting said input manifold and said exit pipe, mechanical and organic filter means in a second hydraulic circuit interconnecting said input manifold and said exit pipe, and pump means for moving a electrolyte from said central portion of said tank through said heat exchanger and filter means to said input manifold and through said flow nozzles onto the faces of the matrices at said plating stations, the electrolyte at each plating station, after it is passed over the plating surface of the matrix, flowing downwardly to the inclined bottom of said tank and to said central portion through said flow passages, and electrical power and control means for each of said plating stations for controlling plating current between the anode assembly and the respective cathode assemblies.

2. An apparatus for electro-forming metallic masters, mothers, and stampers for the manufacture of phonograph records comprising an elongated rectangular plating tank having a pair of plating sections at opposite ends of the tank and a central portion between said plating sections, a pair of baffle plates separating said central portion from said plating sections, said baffle plates extending from front to rear in said tank and spaced from the bottom of said tank providing a flow passage between said central portion and said plating sections, the bottom of said tank being inclined downwardly toward the central portion such that the depth of electrolyte within said tank increases from the ends toward the central portion, means defining a plurality of aligned plating stations along the length of said tank including a cathode assembly mounted at the rear of the tank at each of said stations, said cathode assemblies each having a shaft mounted for rotation about its own axis and for tilting movement of one end of the shaft between a plating position with said shaft inclined downwardly with said one end extending below the surface of electrolyte within the tank, said shaft having means at said one end for securing a disk-like matrix thereto perpendicular to the shaft axis for partial immersion of said matrix in electrolyte in said tank, an anode assembly mounted on the front of said tank including nickel anodes in parallel relationship to the matrices on said cathode shafts when positioned within said tank, an electrolyte circulatory and flow system comprising a flow nozzle at each of said plating stations oriented to flow electrolyte over the circular surface of said matrices, an input manifold connected to each of said flow nozzles, an exit pipe in said tank at said central portion for removing electrolyte from said tank, a heat exchanger, mechanical and organic filter means, piping interconnecting said input manifold with said exit pipe through said heat exchanger and said filter means and pump means for moving electrolyte from said central portion of said tank through said heat exchanger and filter means to said input manifold and through said flow nozzles onto the faces of the matrices at said plating stations, the electrolyte at each plating station, after it is passed over the circular face of the matrix, flowing downwardly to the inclined bottom of said tank and to said central portion through said flow passages, and electrical control means for each of said plating stations for controlling plating current between the anode assembly and the respective cathode assemblies.

3. An apparatus for electro-forming metallic masters, mothers, and stampers for the manufacture of phonograph records comprising an elongated plating tank having a pair of plating sections at opposite ends of the tank and a central portion between said plating sections, a pair of baffle plates separating said central portion from said plating sections, said baffle plates extending from front to rear in said tank and spaced from the bottom of said tank the bottom being inclined downwardly toward the central portion such that the depth of the tank gradually increases from the ends toward the central portion, means defining a plurality of plating stations along the length of said tank including a cathode assembly at each of said stations, said cathode assemblies each having a shaft mounted for rotation about its own axis and for movement of one end of the shaft into and out of the plating tank, said shaft having means at said end for securing a disk-like matrix thereto perpendicular to the shaft axis for rotation with a part of the matrix immersed within electrolyte contained within the tank and a part thereof extending above the level of the electrolyte within the tank, an anode assembly mounted on the front of said tank including nickel anodes in parallel relationship to the matrices on said cathode shafts when positioned within said tank, a flow nozzle at each of said plating stations oriented to flow electrolyte over the circular surface of said matrices, an input manifold connected to each of said flow nozzles, an exit pipe in said tank at said central portion for removing electrolyte from said tank, an electrolyte circuit interconnecting said input manifold and said exit pipe including heat exchange means, mechanical and organic filter means, and pump means for moving electrolyte from said central portion of said tank through said electrolyte circuit to said input manifold and through said flow nozzles onto the faces of the matrices at said plating stations, the electrolyte at each plating station, after it is passed over the plating surface of the matrix, flowing downwardly to the inclined bottom of said tank and to said central portion through said flow passages, and electrical means for providing plating current between the anode assembly and the respective cathode assemblies.

4. An apparatus for electro-forming metallic masters, mothers, and stampers for the manufacture of phonograph records comprising an elongated plating tank having a pair of plating sections at opposite ends of the tank and a central portion between said plating sections, a pair of baffle plates separating said central portion from said plating sections, said baffle plates extending from front to rear in said tank and spaced from the bottom of said tank providing a flow passage between said central portion and said plating sections, the bottom of said tank being inclined downwardly toward the central portion such that the depth of the tank gradually increases from the ends toward the central portion, means defining a plurality of plating stations along the length of said tank including a cathode assembly at each of said stations, said cathode assemblies each having a shaft mounted for rotation about its own axis and for movement of one end of the shaft into and out of the plating tank, said shaft having means at said end for securing a disk-like matrix thereto perpendicular to the shaft axis for rotation with a part of the matrix immersed within electrolyte contained within the tank and a part thereof extending above the level of the electrolyte within the tank, an anode assembly mounted on the front of said tank including nickel anodes in parallel relationship to the matrices on said cathode shafts when positioned within said tank, a flow nozzle at each of said plating stations oriented to flow electrolyte over the circular surface of said matrices, an input manifold connected to each of said flow nozzles, an exit pipe in said tank at said central portion for removing electrolyte from said tank, an electrolyte circuit interconnecting said input manifold and said exit pipe including filter means, and pump means for moving electrolyte from said central portion of said tank through said electrolyte circuit to said input manifold and through said flow nozzles onto the faces of the matrices at said plating stations, the electrolyte at each plating station, after it is passed over the plating surface of the matrix, flowing downwardly to the inclined bottom of said tank and to said central portion through said flow passages, and electrical means for providing plating current between the anode assembly and the respective cathode assemblies.

5. An apparatus for electro-forming metallic masters, mothers, and stampers for the manufacture of phonograph records comprising an elongated plating tank having a plating section and a chamber separated therefrom, said tank having a bottom inclined downwardly toward the chamber, such that said tank is of a greater depth at the chamber than at the ends, a baffle plate separating said chamber from said plating section, said baffle plate extending from front to rear in said tank and spaced from the bottom of said tank providing a flow passage between said chamber and said plating section, means defining a plurality of plating stations along the length of said tank including a cathode assembly at each of said stations, said cathode assemblies each having a shaft mounted for rotation about its own axis and for tilting movement of one end of the shaft into and out of the plating tank, said shaft having means at said end for securing a disk-like matrix thereto perpendicular to the shaft axis, an anode assembly mounted on the front of said tank including anodes mounted in parallel relationship to the matrices on said cathode shafts when positioned within said tank, an electrolyte circulatory and flow system comprising a flow nozzle at each of said plating stations oriented to flow electrolyte over the circular surface of said matrices, an input manifold connected to each of said flow nozzles, an exit pipe in said tank at said chamber for removing electrolyte from said tank, a heat exchanger and filter means interconnecting said input manifold and said exit pipe, and pump means for moving electrolyte from said chamber of said tank through said heat exchanger and filter means to said input manifold and through said flow nozzles onto the faces of the matrices at said plating stations, the electrolyte at each plating station, after it is passed over the plating surface of matrix, flowing downwardly to the inclined bottom of said tank and to said central portion through said flow passages, and electrical power and control means for said plating stations for controlling plating current.

6. An apparatus for electro-forming metallic masters, mothers, and stampers for the manufacture of phonograph records comprising an elongated plating tank having a pair of plating sections at opposite ends of the tank and a central portion between said plating sections, said tank having a bottom inclined downwardly toward the central portion such that said tank is of a greater depth at the central portion than at the ends, a pair of baffle plates separating said central portion from said plating sections, said baffle plates extending from front to rear in said tank and spaced from the bottom of said tank providing a flow passage between said central portion and said plating sections, means defining a plurality of plating stations along the length of said tank including a cathode assembly at each of said stations, said cathode assemblies each having a shaft mounted for rotation about its own axis and for tilting movement of one end of the shaft into and out of the plating tank, said shaft having means at said end for securing a disk-like matrix thereto perpendicular to the shaft axis, an anode assembly mounted on the front of said tank including anodes mounted in parallel relationship to the matrices on said cathode shafts when the said ends of said shafts are tilted into said tank, an electrolyte circulatory system comprising a flow nozzle at each of said plating stations oriented to flow electrolyte over the circular surface of said matrices, an input manifold connected to each of said flow nozzles, an exit pipe in said tank at said central portion for removing electrolyte from said tank, a heat exchanger and filter means interconnecting said input manifold and said exit pipe, and pump means for moving electrolyte from said central portion of said tank through said heat exchanger and filter means to said input manifold and through said flow nozzles onto the faces of the matrices at said plating stations, the electrolyte at each plating station, after it is passed over the plating surface of the matrix, flowing downwardly to the inclined bottom of said tank and to said central portion through said flow passages, and electrical power and control means for each of said plating stations for controlling plating current between the anode assembly and the respective cathode assemblies.

References Cited by the Examiner
UNITED STATES PATENTS

| | | | |
|---|---|---|---|
| 2,240,300 | 4/41 | Hunter | 204—5 |
| 2,738,317 | 3/56 | Daniel | 204—5 |
| 2,741,594 | 4/56 | Bowersett | 204—212 |
| 2,979,452 | 4/61 | Ludwig et al. | 204—212 |

JOHN H. MACK, *Primary Examiner.*